United States Patent [19]

Erdmann

[11] 4,024,709

[45] May 24, 1977

[54] BRAKE SYSTEM FOR AUTOMOTIVE VEHICLE EQUIPPED WITH OTTO ENGINES

[75] Inventor: Hans Erdmann, Neu-Isenburg, Germany

[73] Assignee: ITT Industries, Inc., New York, N.Y.

[22] Filed: Feb. 6, 1976

[21] Appl. No.: 655,807

[30] Foreign Application Priority Data

Feb. 12, 1975 Germany .......................... 2505880

[52] U.S. Cl. .................................. 60/397; 60/403; 60/430

[51] Int. Cl.² .......................................... F15B 20/00

[58] Field of Search ............ 60/397, 430, 403, 405, 60/411

[56] References Cited

UNITED STATES PATENTS

| | | | |
|---|---|---|---|
| 2,601,757 | 7/1952 | Horton | 60/430 X |
| 2,732,685 | 1/1956 | Oishei | 60/397 |
| 2,844,003 | 7/1958 | Ingres | 60/397 |

*Primary Examiner*—Edgar W. Geoghegan
*Attorney, Agent, or Firm*—John T. O'Halloran; Thomas M. Marshall

[57] ABSTRACT

This invention discloses a brake system for use in automotive vehicles having Otto engines which includes a vacuum operated brake booster and a vacuum pump for generating the necessary vacuum for effective operation of the brake booster. A vacuum pump is positioned between and connected to the vacuum brake booster and the inlet manifold or carburetor induction pipe of an Otto engine. Means are provided for automatically switching the vacuum pump on if there is an insufficient amount of vacuum in the brake booster and also at the same time there is a predetermined amount of vacuum in the intake manifold.

3 Claims, 1 Drawing Figure

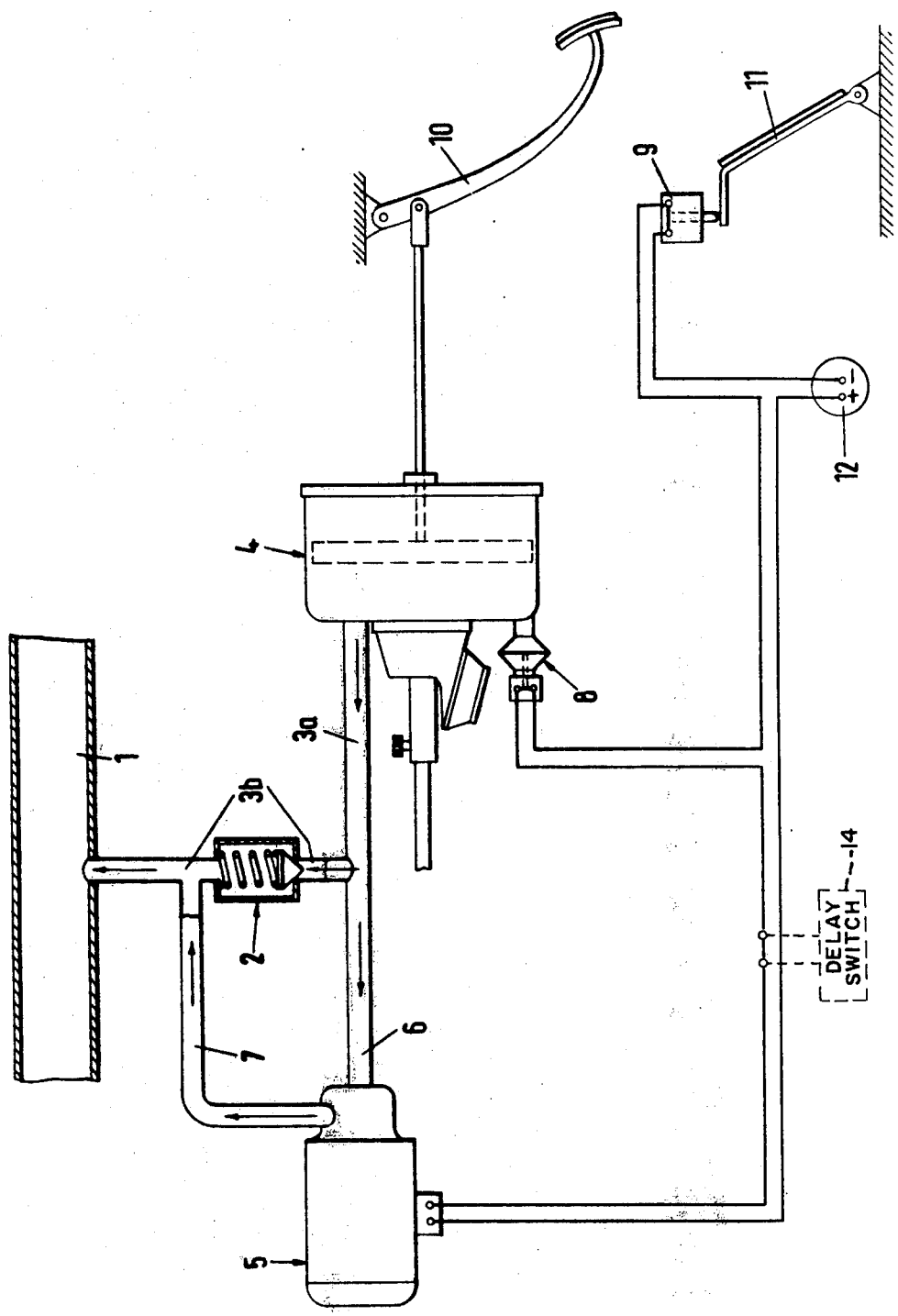

BRAKE SYSTEM FOR AUTOMOTIVE VEHICLE EQUIPPED WITH OTTO ENGINES

BACKGROUND OF THE INVENTION

1. Field of the Invention

Brake systems including vacuum operated brake boosters.

2. Prior Art

Vacuum operated brake boosters in brake systems are conventionally operated at differential pressures ranging between 0.7 and 0.8 bars. In an Otto cycle engine powered automotive vehicle it has been conventional practice to utilize the vacuum in the induction pipe of the carburetor (or intake manifold) as the vacuum source for such brake boosters. In recent years because of the legal regulations in respect to exhaust emission control many of the automotive vehicles having Otto engines no longer generate a desired vacuum of a 0.2 to 0.3 bars. In order to achieve a sufficient brake boosting effect utilizing a vacuum operated brake, the diameters of such brake boosters had to be enlarged in order to achieve the same braking force with the smaller pressure differential available. Other efforts which have been made to make use of the small pressure differential reside in providing brake boosters with two pistons arranged in tandem. In some cases it has been advantageous to utilize a separate vacuum pump as the vacuum source instead of using the carburetor induction pipe or intake manifold. This latter solution has become common practice in diesel-engine cars. In each of the above instances the various methods employed render a brake system considerably more expensive. Furthermore to make the brake booster large in diameter is often not possible because, for engineering reasons, the space available under the hood for mounting the brake booster has become more and more restricted due to the increasing tendency towards compact cars.

SUMMARY OF THE INVENTION

It is the principle object of this invention to provide a brake system for Otto engine automotive vehicle which allows the use of a vacuum operated brake booster of minimum size, cost and space requirements and one which is operative for engines generating at least temporarily an insufficient amount of vacuum to operate the brake booster effectively.

The object of this invention is attained by interposing a vacuum pump between the brake booster and the induction pipe or manifold of an Otto engine and includes means for automatically switching the vacuum pump on if there is an insufficient amount of vacuum in the brake booster while at the same time there is a predetermined amount of vacuum in the induction pipe. Thus the device of this invention provides for operation of the vacuum pump only if there is a predetermined amount of vacuum in the induction pipe of the carburetor. Accordingly, there is no need for the vacuum pump to generate the full vacuum for operation of the brake booster but only to generate that amount of differential pressure which will operate the brake booster effectively as compared to the vacuum present in the carburetor induction pipe. This differential pressure is comparatively low because even under adverse conditions a vacuum of 0.6 bars prevails in the induction pipe during the operation of Otto cycle engines while the engine is running idle. Thus, the limited operation of the vacuum pump in the system of this invention permits the use of a very inexpensive pump which does not involve great usage of space or lead to loss of clearances.

In operation, the device of this invention will, following a period of some length during which time the car has not been used, operate upon the starting of the vehicle engine until the required degree of vacuum occurs in the brake booster or until a sufficient degree of vacuum is lost in the carburetor's induction pipe by depression of the accelerator pedal. As a rule, the brake booster is thus sufficiently evacuated at the time the operator starts to move the vehicle. Should this not be the case as a consequence of rapid depression of the brake pedal after the starting the vehicle or if the vacuum in the brake booster is lost again following a full throttle ride of some length, the vacuum pump would start running the moment the operator releases the accelerator pedal in order to actuate the brake. Since the brake booster is not completely evacuated first, the brake performance is not at its maximum in that first moment. However, the delivery of the vacuum pump in the system of this invention is designed so that full brake boost effect is available after a negligibly short period. Advantageously the vacuum pump in the system of this invention is switched on while the Otto engine is running by means of both a pressure switch provided at the brake booster and a limit switch associated with the accelerator pedal which is actuated when the accelerator pedal is released. In order to ensure that the vacuum pump is switched on only while the engine is running, it is advantageous to supply the electrical power to the vacuum pump from the generator or alternator rather than the automotive vacuum pump from the generator or alternator rather than the automotive vehicle's battery.

In a modification of the brake system of this invention a predetermined time delay is introduced before the vacuum pump switch is on when there is vacuum available in the induction pipe and there is an insufficient amount of vacuum present in the brake booster. It has been found that a delay of about 0.3 of a second is the optimum time. Such delay is appropriate since during the engine braking mode of the Otto engine it will generate a vacuum sufficient to effectively evacuate the brake booster. Simply, the delay in switching on the vacuum pump always gives priority to the Otto engine as the vacuum source rather the vacuum pump itself. In many cases the period of 0.2 seconds is sufficient to achieve satisfactory evacuation of the brake booster by means of the vacuum generated by the Otto engine. Thus, there is, in this embodiment the brake system of this invention, incorporated a delay such that the vacuum pump will be switched on only rarely.

In accordance with a further embodiment of this invention the vacuum in the brake booster which is the determining influence on the operation of the vacuum pump is lower while the engine is running idle than it is while the engine is running at higher speeds. The purpose of this embodiment is to avoid the necessity for an interrupted pump operation over a considerable length of time. For the brake system of this invention a very primitive, simple vacuum pump is all that is required. Such a pump usually has no cooling equipment and can store all of the heat generated during the operation. Thus, it is expedient to restrict the time during which the pump is running without interruption. It can be satisfactorily assumed that the speed of a vehicle whose engine is running at idle is not very high. Consequently, no high braking forces are required. When starting the vehicle equipped with the brake system of this embodiment of the invention after the vehicle has lain idle for a period of time the vacuum pump need not generate the full vacuum of say 0.2 bars but only of 0.5 bars. This affords a short time of operation of the pump. The heat developed, mainly in the electromotor which drives the pump, can be stored by the pump and the electromotor without damage. Full evacuation of the brake booster will occur only during the first braking, while the speed is still high in which case when the accelerator pedal is released and the engine braking mode occurs, thereby causing the presence of vacuum in the induction pipe. If the vacuum available in the induction pipe, is sufficient to effectively evacuate the brake booster, the vacuum pump will not be switched on because of the time delay provided. In this instance the Otto engine is thus adequate enough to serve as the vacuum source. If the Otto engine does not suffice for evacuation, the vacuum pump will be switched on temporarily. However, it must overcome only a small pressure differential since, in the engine braking mode and with the accelerator pedal released, there is a substantial degree of vacuum in the induction pipe.

BRIEF DESCRIPTION OF THE DRAWING

The drawing illustrates diagrammatically the brake system of this invention.

DESCRIPTION OF THE PREFERRED EMBODIMENTS

In the drawing the induction pipe 1 is specifically for an Otto engine, not shown. From the induction pipe 1, lines 3a and 3b lead to a vacuum operated brake booster 4 via check valve 2. An electrically operated vacuum pump 5 is connected to the brake booster 4 and the induction pipe 1. Through line 6 and line 3a the vacuum pump 5 draws air from the brake booster 4 and urges the air into the induction pipe 1 above check valve 2 through line 7 which terminates in line 3b, as indicated in the figure.

The vacuum pump 5 is activated by vacuum pressure switch 8 at the brake booster 4 and by limit switch 9 associated with accelerator pedal 11. The supply of electrical current for the vacuum pump 5 is shown schematically in the drawing which includes ignition lock 12. The brake pedal 10 is operatively connected to brake booster 4.

It will be seen that for vacuum pump 5 to operate there must be a circuit established through ignition lock 12, limit switch 9 and vacuum pressure switch 8.

As discussed above, in an alternate embodiment of this invention a delay switch 14 may be provided which will provide for a delay in the operation of the vacuum pump for a period of time of from 0.2 to 0.3 seconds so that the source of vacuum for the brake booster 4 is always preferentially the induction pipe 1.

Further, as described above because of the infrequent operation of the vacuum pump 5 of this invention and its running time being relatively short, it only need make up for the differential pressure between the desired effective vaccum to operate the brake booster and that existing in the induction pipe 1, and accordingly a relative inexpensive vacuum pump may be employed.

It will be seen from the above that the brake system of this invention utilizes an inexpensive vacuum pump as a supplementary source of vacuum to effectively operate a vacuum operated brake booster.

What is claimed is:

1. A brake system for use in automotive vehicles equipped with Otto engines including a vacuum operated brake booster and a vacuum pump, said vacuum pump being positioned between the brake booster and the induction pipe for said Otto engine including:
   means for automatically switching on said vacuum pump only when there is insufficient amount of vacuum in the brake booster and at the same time there is a predetermined amount of vacuum in said induction pipe, and
   further including means for switching on the vacuum pump only while the Otto engine is running, which means includes a pressure switch associated with said brake booster and a limit switch associated with the accelerator pedal for said engine which is actuated only when said accelerator pedal is released.

2. The brake system as set forth in claim 1 which further includes a predetermined time delay means interposed whereby said vacuum pump will only switch on when there is a vacuum available in said induction pipe and an insufficient amount of vacuum in said brake booster.

3. The brake system as set forth in claim 1 wherein said vacuum switch means associated with said brake booster operates to switch on said vacuum pump when the vacuum in said brake booster is lower while said engine is running idle then it is when said engine is running at higher speeds.

* * * * *